US009625261B2

(12) United States Patent
Polansky et al.

(10) Patent No.: US 9,625,261 B2
(45) Date of Patent: Apr. 18, 2017

(54) SYSTEM AND METHOD FOR MANAGING SPEED CONSTRAINTS DURING REQUIRED TIME OF ARRIVAL OPERATIONS

(71) Applicant: HONEYWELL INTERNATIONAL INC., Morristown, NJ (US)

(72) Inventors: Michal Polansky, South Moravia (CZ); Erwan Paricaud, Haute Garonne (FR); Dorothee De Villele, Haute-Garonne (FR); Zdenek Jancik, Vysocina (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 49 days.

(21) Appl. No.: 14/477,476

(22) Filed: Sep. 4, 2014

(65) Prior Publication Data
US 2016/0069688 A1 Mar. 10, 2016

(51) Int. Cl.
*G01C 21/00* (2006.01)
*G05D 1/00* (2006.01)
*G05D 1/02* (2006.01)
*G08G 5/00* (2006.01)

(52) U.S. Cl.
CPC .......... *G01C 21/00* (2013.01); *G05D 1/0005* (2013.01); *G05D 1/0202* (2013.01); *G08G 5/00* (2013.01); *G08G 5/0021* (2013.01); *G08G 5/0052* (2013.01)

(58) Field of Classification Search
None
See application file for complete search history.

(56) References Cited

U.S. PATENT DOCUMENTS

| | | |
|---|---|---|
| 6,507,782 B1 | 1/2003 | Rumbo et al. |
| 8,010,267 B2 | 8/2011 | Klooster et al. |
| 8,150,565 B2 | 4/2012 | Wachenheim et al. |
| 8,180,506 B2 | 5/2012 | Sacle et al. |
| 8,321,071 B2 | 11/2012 | Klooster |
| 8,332,145 B2 | 12/2012 | Dacre-Wright et al. |
| 8,386,097 B2 | 2/2013 | de Menorval et al. |
| 8,406,939 B2 | 3/2013 | Jackson et al. |
| 8,473,120 B2 | 6/2013 | Blanchon et al. |
| 8,788,189 B2 | 7/2014 | Polansky et al. |
| 2005/0283281 A1 | 12/2005 | Hartmann et al. |

(Continued)

FOREIGN PATENT DOCUMENTS

WO 02093281 A1 11/2002

OTHER PUBLICATIONS

EP Extended Search Report for Application No. EP15182243.4 Dated Jan. 29, 2016.

*Primary Examiner* — Thomas Tarcza
*Assistant Examiner* — Garrett Evans
(74) *Attorney, Agent, or Firm* — Lorenz & Kopf, LLP (57) ABSTRACT

A method and apparatus includes strategies for improving required time of arrival reliability by an aircraft comprising determining a speed correction for one of AT speed constraints or an AT or ABOVE speed constraints, wherein the determining is selected from one or more of the mechanisms from the group consisting of continuous RTA speed management between constraints, padding of the AT speed constraints and the AT or ABOVE speed constraints; decelerating proactively; and using a variable guidance margin, wherein the guidance margin is a speed change not reflected in a flight plan prediction.

18 Claims, 6 Drawing Sheets

(56) References Cited

U.S. PATENT DOCUMENTS

| | | |
|---|---|---|
| 2006/0025898 A1 | 2/2006 | Charles |
| 2009/0259351 A1* | 10/2009 | Wachenheim ....... G05D 1/0202 701/7 |
| 2010/0125382 A1 | 5/2010 | Wachenheim et al. |
| 2010/0217459 A1* | 8/2010 | Caillaud .............. G05D 1/0005 701/3 |
| 2011/0295501 A1 | 12/2011 | Gutierez-Castaneda et al. |
| 2014/0067245 A1 | 3/2014 | Polansky et al. |

* cited by examiner

SYSTEM AND METHOD FOR MANAGING SPEED CONSTRAINTS DURING REQUIRED TIME OF ARRIVAL OPERATIONS

TECHNICAL FIELD

The exemplary embodiments described herein generally relate to managing aircraft mission profiles and more particularly to managing speed constraints for reaching a waypoint at a required time of arrival.

BACKGROUND

Worldwide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. In order to handle the expected increase in air traffic, the Next Generation Air Transportation System (NextGen) will introduce major transformations in Air Traffic Management (ATM), for example, aircraft trajectory-based operations. Trajectory-based operations will manage National Airspace System (NAS) resources by requiring aircraft to precisely follow custom-made 4-D trajectories consisting of a specified path along-path time conformance requirements. This promotes prescribing and accurately following trajectories that ensure separation and optimize traffic flow management over different time horizons, which will significantly improve flight safety and performance.

However, one issue associated with the 4D operational concept is that deconfliction of the airspace and prevention of a separation infringement requires a reliable 4D trajectory. It uses Required Time of Arrival (RTA) to guarantee the reliability of time of arrival at a merging waypoint (RTA waypoint). However, the reliability before the waypoint is not guaranteed. An aircraft not compliant with its 4D trajectory may allow the spacing between aircraft to become too small.

Known flight management system (FMS) software is able to handle only AT or BELOW speed restrictions for climbs and descents. And from the RTA perspective, a recently developed system (Honeywell U.S. Pat. No. 8,406,939) accounts for a speed pad on top of the descent speed restriction, in order to protect the speed from premature saturation in the restriction area. The addition of the AT OR ABOVE and AT speed constraints raises the issue of how to handle them together with the RTA and maintain reliability of the RTA. With these supplementary types of speed restrictions, a new mechanism is needed to determine the speeds required along the flight trajectory to satisfy the RTA, and a new speed pad is needed that can be later used in the constrained area. The AT or ABOVE speed constraint definition is slightly different from the intuitive expectation wherein the speed in descent is expected to be above the constraint value before the constrained waypoint, and vice versa for climb. The AT speed constraint is a combination of AT or ABOVE and AT or BELOW components. When an AT speed constraint is defined in the flight plan, either in climb or descent, the whole flight phase undesirably may be considered under speed restrictions, which is detrimental to achieving a time constraint.

Accordingly, it is desirable to provide a system and method for managing time error at a RTA waypoint in the presence of an AT speed constraint or an AT or ABOVE speed constraint. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for managing time error at a RTA waypoint in the presence of an AT speed constraint or an AT or ABOVE speed constraint.

A first exemplary embodiment is a method for an aircraft to accomplish a required time of arrival at a waypoint, comprising determining an aircraft speed and speed profile required along a given flight plan containing one or more speed constraints including AT, AT OR BELOW or AT or ABOVE speed constraints and a required time of arrival (RTA), wherein the determining the speed profile is selected from one or more of the mechanisms consisting of continuous RTA ECON speed management between speed constraints; padding of an AT speed constraint and an AT or ABOVE speed constraint; decelerating proactively; and using a variable guidance margin, wherein the guidance margin is a speed change not included in a flight plan prediction A second exemplary embodiment is a method for an aircraft to accomplish a required time of arrival at a waypoint and at a desired speed, comprising padding one of an AT or ABOVE and AT OR BELOW components of a speed constraint to preserve control margins; correcting an initial time error using the Continuous RTA ECON speed management between constraints; reducing a positive speed pad on the AT OR ABOVE component if the RTA speed falls below the lowest AT or ABOVE component of a speed constraint plus a Padpos speed; increasing the Padpos speed to an initial value PadNom prior to increasing the RTA speed above the padded speed; using a speed pad PadNeg under AT OR BELOW speed constraints; using a guidance margin mechanism to increase robustness, reliability and also smoothness of RTA control; and activating, where the RTA speed is not modifiable, a proactive deceleration as the aircraft approaches a deceleration segment to an AT or AT or BELOW speed constraints or an approach speed.

A third exemplary embodiment is a system determining an aircraft four dimensional trajectory along a path to a waypoint having a required time of arrival, the system comprising a processor configured to calculate a first estimated speed to reach the waypoint at the required time of arrival via a required time of arrival solver; compute in real time a time difference between an estimated time of arrival at the first estimated speed and the required time of arrival via a trajectory predictor; and determine a speed correction for one of an AT speed constraint or an AT or ABOVE speed constraint via the speed profile generator, wherein the determining a speed correction is selected from one or more of the mechanisms consisting of continuous RTA ECON speed management between speed constraints; padding of the AT or ABOVE speed constraints; decelerating proactively; and using a variable guidance margin, wherein the guidance margin is a speed change not included in a flight path prediction; and a display configured to display a graph including the first estimated speed; a second estimated speed; and a third estimated speed if the speed 1 is above the highest AT or ABOVE speed constraint.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A method and system for enabling RTA operations in the presence of AT speed constraints, or AT or ABOVE speed constraints that improves required time of arrival (RTA) reliability in accordance with exemplary embodiments includes four mechanisms used either individually or simultaneously to deal with the time error at the RTA waypoint. The four mechanisms include 1) the continuous RTA ECON speed management between constraints, 2) speed pad mechanism of the AT and AT or ABOVE speed constraints; 3) proactive deceleration; and 4) variable guidance margin. ECON speed is the speed at which the minimum cost is obtained considering both fuel and time, whose ratio is defined by a cost index entered by the pilot. For example, the larger the cost index, the more important it is to remain in the air a shorter period of time (e.g., a higher airspeed). A lower cost index, the more important it is to conserve fuel.

With the variable guidance margin mechanism described herein, for example, managing time error at a RTA waypoint in the presence of an AT speed constraint or an AT or ABOVE speed constraint, the re-computation of the speeds along the trajectory would be less frequent or not necessary, reducing the risk of speed saturation before the RTA waypoint, reducing the need for speed break, and keeping the 4D trajectory close to its original definition. If only small changes in speed occur during a vertical trajectory, for example during climbs and descents, the descent vertical trajectory would remain close to the optimal one. The exemplary embodiments described herein minimize the variation of the vertical trajectory by reducing occurrences of vertical path recapture maneuvers. These maneuvers often require use of airbrakes that are not efficient from a fuel, noise or comfort perspective. A benefit of the exemplary embodiments is the higher reliability of the 4D trajectory and the RTA reliability in all flight phases, which is the key enabler of the future air traffic management concept developed under SESAR and NEXTGEN projects.

Figure 1:
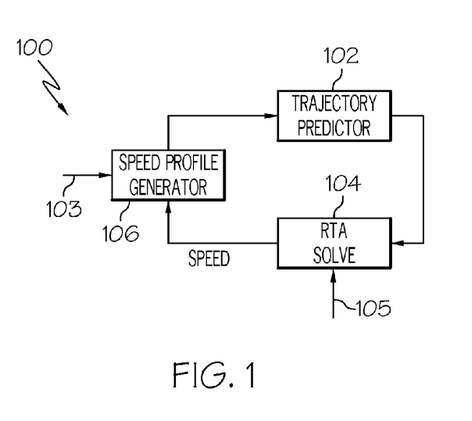
FIG. 1 is a functional block diagram of an algorithm in accordance with the preferred embodiment.

The strategy mentioned above is accomplished by a system in accordance with the exemplary embodiment of diagram 100 of FIG. 1. A trajectory predictor 102 computes the ETA. A RTA solver 104 determines the speed adjustment in response to a signal 105 providing the RTA. A speed adjustment parameter, determined from the ETA and ETA partial derivatives, and the speed adjustment, is applied by the speed profile generator 106. The algorithm converges quickly in several passes around the diagram 100, depending upon the magnitude of the time error at the initial speed profile 103.

In order to reject disturbances encountered during flight, the algorithm is executed repeatedly during the flight based on the latest navigational sensor data. Since each iteration of the algorithm requires a full pass of the trajectory predictions to perform, it will execute periodically, for example every 1 to 10 seconds, depending upon the speed of the FMS processor. After each iteration, the necessary method or combination of methods mentioned above is selected and applied. During this interval, the speed profile generated from the most recent iteration is sent to the guidance system.

It should be understood that FIG. 1 is a simplified representation of an algorithm 100 for purposes of explanation and ease of description, and FIG. 1 is not intended to limit the application or scope of the subject matter in any way. In practice, the algorithm 100 may include other functions and components for providing additional functions and features, as will be appreciated in the art.

Figure 2:
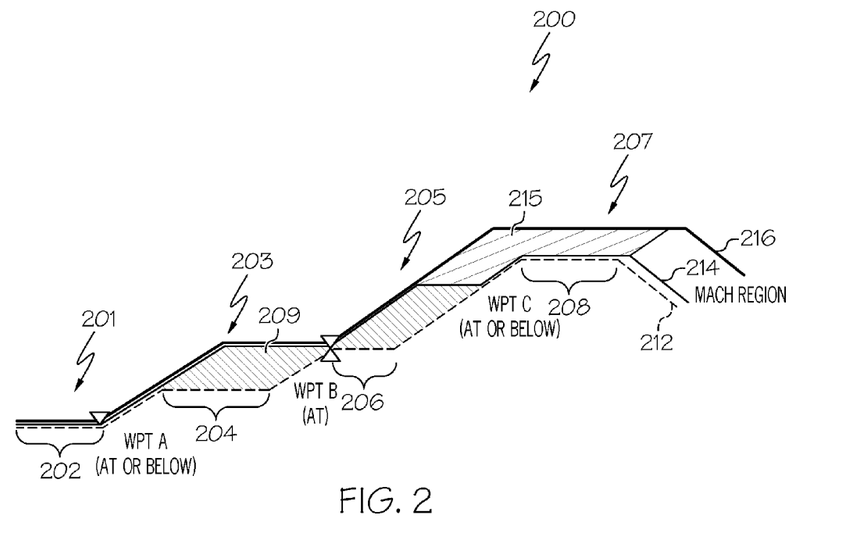
FIG. 2 is a graph of error from a predicted ascent trajectory versus time between waypoints in accordance with the exemplary embodiment.

The determination of the speeds required along the flight trajectory (speed profile) to satisfy an entered time constraint (RTA) takes into account any applicable AT OR BELOW and/or AT OR ABOVE components of speed restrictions existing along the given flight trajectory, in order to reach the RTA waypoint without violating speed restrictions. The continuous RTA ECON speed management between speed constraints is illustrated, and which may be displayed to the pilot, by the exemplary climb scenario 200 in FIG. 2. Waypoints WPT A, WPT B, WPT C are bounded by legs 201, 203, 205, 207, and contains AT OR BELOW, AT, and AT OR ABOVE speed constraints. Progression of an aircraft (not shown) is from WPT A to WPT B and to WPT C. If the RTA algorithm initially determines that RTA ECON1 speed 212 is to be maintained to satisfy the time constraint, then the speed profile is constructed by maintaining RTA ECON1 speed 212 between WPT A and WPT B. The speed on the legs 205 and 207 is then maintained as close to the RTA ECON1 speed 212 as possible, while satisfying applicable speed restriction. There is a constant speed segment 202 before WPT A, a constant speed segment 204 between WPT A and WPT B, a constant speed segment 206 after WPT B, and a constant speed segment 208 after WPT C. If the RTA algorithm changes the RTA ECON1 speed 212 such that it still falls within the WPT A and WPT B constraints, e.g., within the region 209, then the speed profile in the other segments 205, 207 won't change. The region 209 is the area corresponding to time error compensated by change from RTA ECON1 to RTA ECON2. Similarly if the RTA ECON2 speed 214 is required, the speed at surrounding region 215 will be kept as close to the RTA ECON2 speed as possible in legs 203 and 207. The region 215 is the area corresponding to time error compensated by change from RTA ECON2 to RTA ECON3. The RTA ECON3 speed 216 is displayed if the required speed to comply the time constraint is determined to be above the highest AT or ABOVE speed constraint component. This processing of the speed profile ensures smooth time adjustments without discontinuities and unexpected jumps.

Nevertheless, if necessary, the flight management system may determine a speed profile corresponding to the lower limit of each AT OR ABOVE speed restriction. In such a situation, as the aircraft is flown at its authorized minimum speed, it is impossible for it to decelerate further, even though it would be required to satisfy the entered time constraint. Hence, as will be detailed below, speed pads can furthermore be incorporated into the speed profile to protect the speed from premature saturation in the restriction area.

Incorporation of speed pads on top of the AT OR BELOW and/or AT OR ABOVE components of speed constraints preserves the control authority, or ability to achieve the desired RTA, by saving some speed margin in speed constraint regions. Speed pads thus increase the lower limit (respectively decrease the upper limit) of the speed profile in the area of application of an AT OR ABOVE (respectively AT OR BELOW) speed constraint. This might be especially useful in the higher portion of the trajectory, where speed could be saturated (i.e., has reached the authorized minimum/maximum speed) even before the aircraft enters the descent due to the presence of a downpath AT OR ABOVE speed constraint. The RTA would become highly unreliable as the speed cannot be adjusted in the constraint region.

Figure 3:
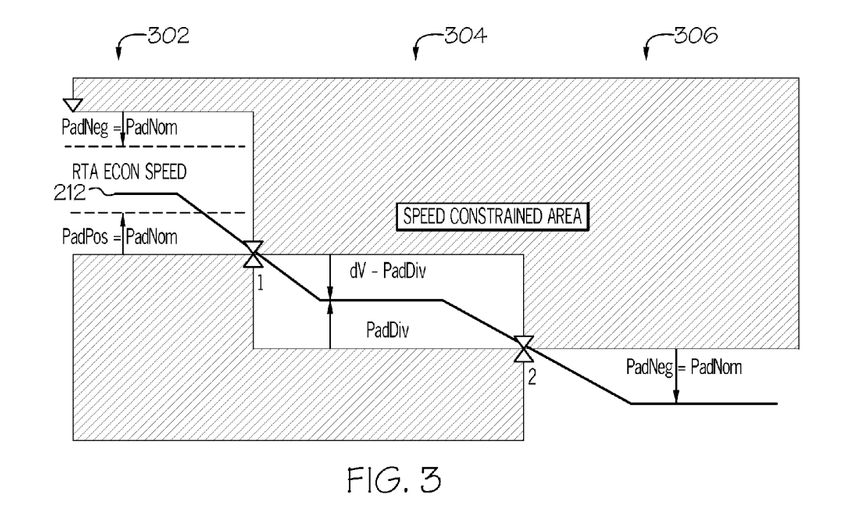
FIG. 3-6 are graphs illustrating speed pad definition between various speed constraints in accordance with the exemplary embodiment.

FIG. 3 shows usage of the padded airspeed (pad) in three areas 302, 304, 306 of a descent speed profile. In the area 302 before the WPT 1, the AT or ABOVE component of AT speed constraint is padded by the PadPos value determined by the RTA algorithm together with the PadNeg value applied on the AT or BELOW constraint after the WPT2 in area 306. A PadDiv value may be computed to maintain speed margin from the upper speed limit and the lower speed limit in the (middle) area 304. The PadPos and PadNeg have a nominal value PadNom. The RTA algorithm determines the values of the PadPos and PadNeg, where at least one of them is equal to PadNom. The PadDiv is then computed for each area i, where the speed constraints difference dV(i) is less than 2*PadNom from each other as follows:

If $dV(i)<2*PadNom$, then

If $PadPos<PadNom$ then $PadDiv(i)=PadPos*dV(i)/2/PadNom$;

Else if $PadNeg<PadNom$, then $PadDiv(i)=(2*PadNom-PadNeg)*dV(i)/2/PadNom$;

Else $PadDiv(i)=dV(i)/2$.

The AT or ABOVE constraint padding principle allows full modification of the speeds below the AT speed constraint by use of, for example, 1) an unlimited PadNeg value that is only initiated, but not limited to PadNom, 2) the "continuous RTA ECON speed management between constraints" described above, and 3) the proactive deceleration described below.

Figure 4:
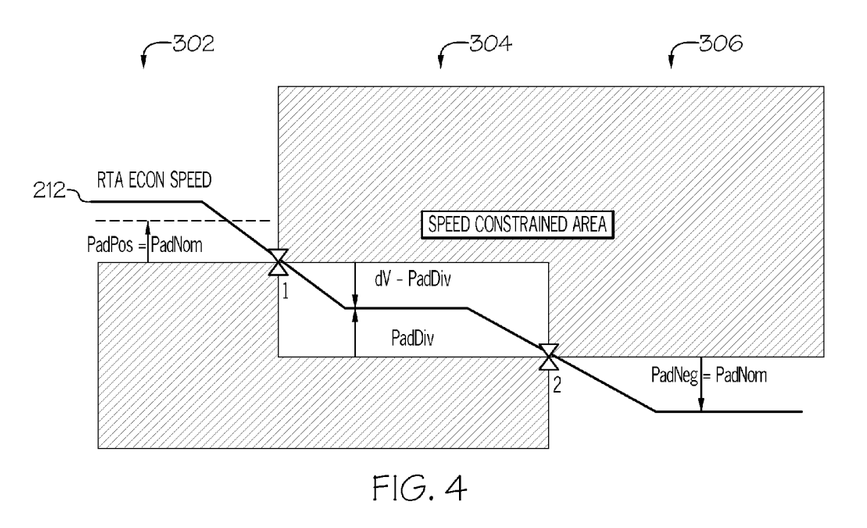
Figure 5:
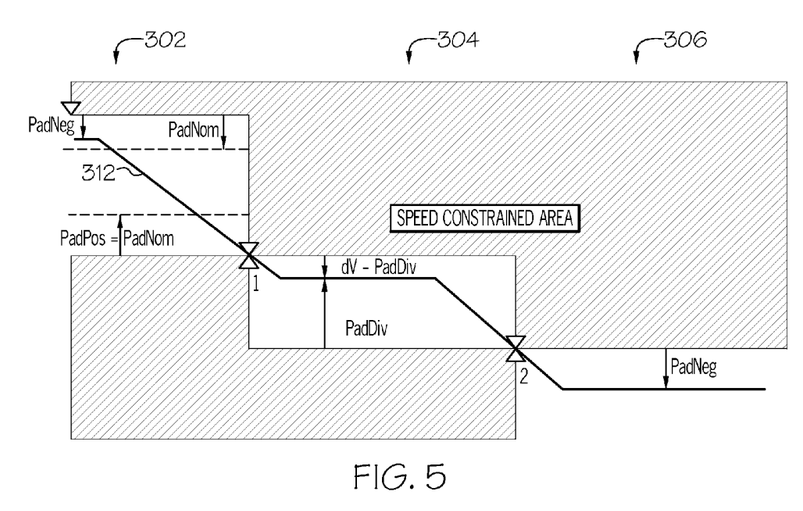
Figure 6:
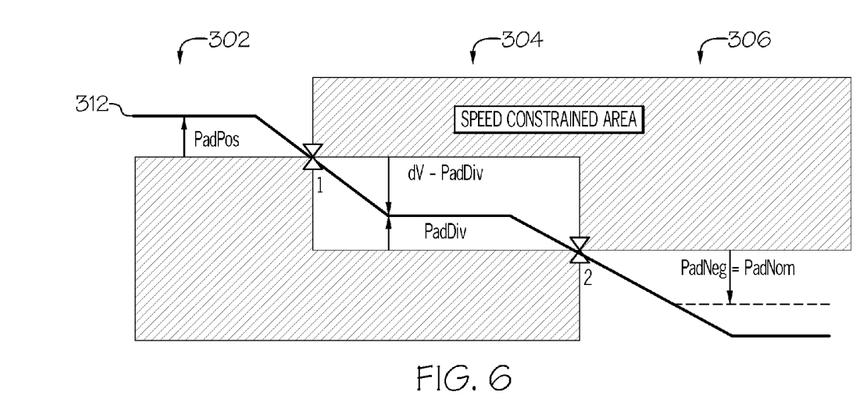

Incorporation of speed pads for AT OR ABOVE and AT speed constraints results in the given speed constraint to be located within a deceleration segment, as shown on FIGS. 3-7, resulting in the aircraft not be stabilized on the speed. As such, any unreliable parameter entered by the aircraft operator and taken into account in the computation of the speed profile (for example the wind or the temperature) can lead to a discrepancy between the deceleration rate predicted by the device, and the actual aircraft behavior. Hence, the reliability of speed constraint compliance is reduced. FIG. 3 illustrates the speed pads PADPOS and PADNEG equaling a nominal PADNOM and corresponding predicted descent speed profile, if the RTA ECON speed 312 is between the constraints padded by the nominal pad PadNom. FIG. 4 illustrates the speed pads PADPOS and PADNEG equaling a nominal PADNOM and corresponding predicted descent speed profile, when the aircraft is far from constrained area and the RTA ECON speed 312 is above the AT or ABOVE constraint padded by the nominal pad PadNom. FIG. 5 illustrates the speed pad PADPOS, but not PADNEG, equaling a nominal PADNOM. FIG. 6 illustrates the speed pad PADNEG, but not PADPOS, equaling a nominal PADNOM.

Figure 7:
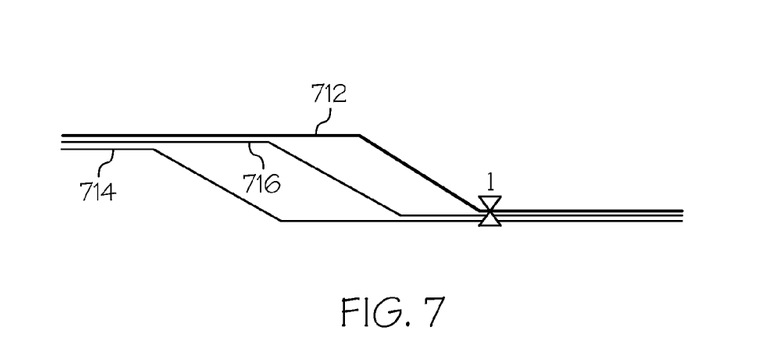
FIG. 7 is a graph illustrating the proactive deceleration mechanism in accordance with the exemplary embodiment.

Usage of the proactive deceleration mechanism illustrated in FIG. 7, where line 712 represents the original deceleration profile, and lines 714, 716 represent proactive deceleration profiles, overcomes this drawback by starting deceleration to the constraint speed earlier to ensure that the speed constraint will be crossed at the correct speed. The principle can be also used for correction of the time error for RTA purposes, where the system adjusts the deceleration.

The existing guidance margin has a fixed size of, for example, either +2 kts or −3 kts (see U.S. Pat. No. 8,788, 189). However, if the required speed to satisfy the entered time constraint is saturated (i.e., has reached the authorized minimum/maximum speed) close to the RTA waypoint, for example due to the AT or ABOVE (respectively AT or BELOW) speed constraints, then the size of the guidance margin can be increased in order to allow the aircraft to decelerate (respectively accelerate) further and thus recover some control authority. The closer the aircraft is to the RTA waypoint, the shorter is time for correction of a time error; therefore, the Guidance margin needs to be increased to be efficient. The maximum expected value (preferred) may be +−5 kts to safely stay inside the tolerance of the speed constraints. The guidance margin could be set differently at different altitudes and on different trajectory segments to be efficient, but still comply with the applicable limitations.

The mechanisms described above may be used according to the following method: 1) Upon RTA entry by the aircraft operator, the AT or ABOVE speed constraint and the AT or BELOW speed constraint are padded to preserve control margins in the constrained areas. 2) The initial time error is corrected using the continuous RTA ECON speed modification between constraints. If the RTA ECON speed falls below the lowest AT or ABOVE constraint plus the Padpos, then the Padpos is reduced. 3) If the Padpos was already reduced and the speed needs to be increased, then the Padpos is increased first until it reaches its initial value. Only then the RTA ECON speed is increased. 4) The mechanism of usage the Pad under At or Below speed constraints is described in the U.S. Pat. No. 8,406,939, assigned to the Assignee of this disclosure and incorporated herein by reference. 5) During the flight, the Guidance Margin mechanism described in the U.S. Pat. No. 8,788,189, assigned to the Assignee of this disclosure and incorporated herein by reference, could be used to increase robustness, reliability and also smoothness of RTA control. The additional considerations described herein would improve its efficiency. 6) The Proactive deceleration method could be activated once the aircraft is close to the area, where the RTA ECON speed is not modifiable, like on deceleration segments to AT or BELOW speed constraints or towards the approach speed. It could be used to gain additional margin to prevent the expected errors to cause missing the RTA. This mechanism may not be operationally beneficial over the continuous RTA ECON speed management in descent, but could be used in some specific cases, as those specified above.

Figure 8:
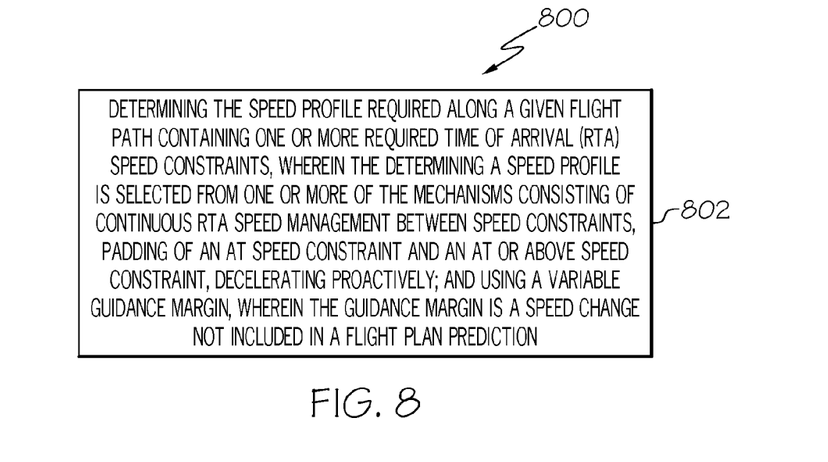
FIG. 8 is a flow chart of a method for reaching the waypoint at the required time of arrival in accordance with the exemplary embodiment.
Figure 9:
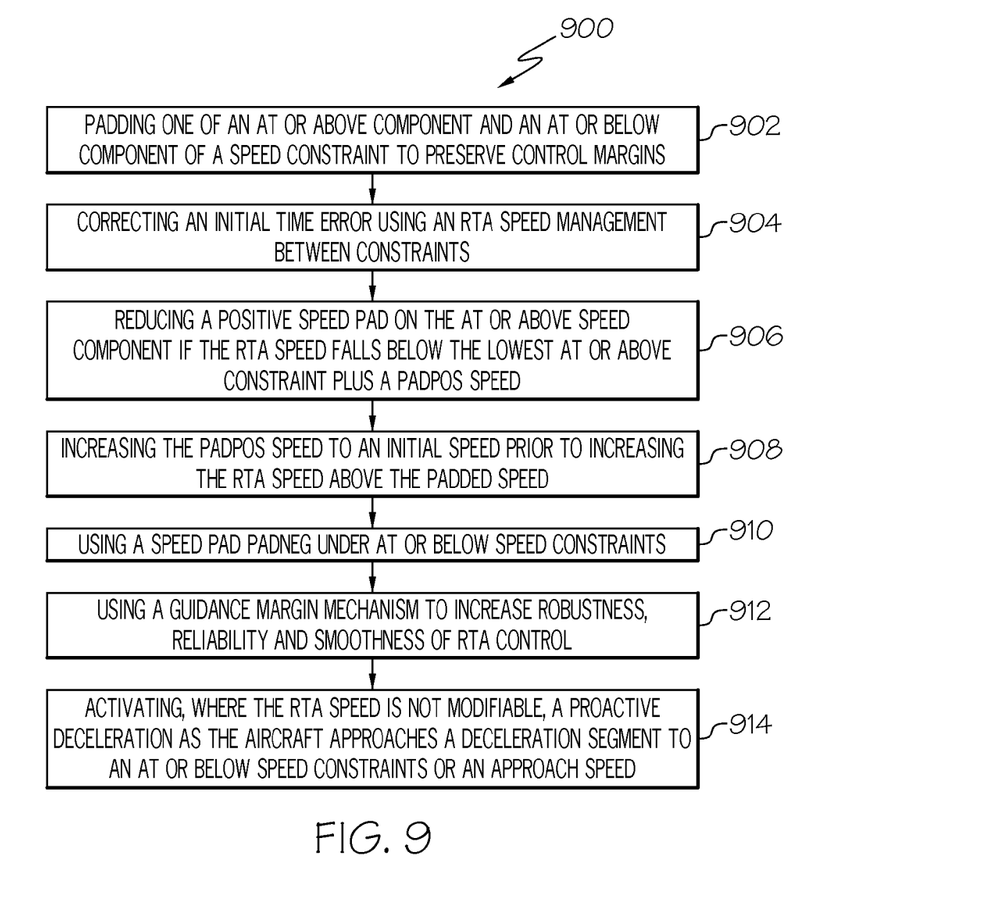
FIG. 9 is a flow chart of another method for determining the speed required of the aircraft in accordance with the exemplary embodiment.

FIGS. 8 and 9 are flow charts that illustrate an exemplary embodiment of processes 800, 900 suitable for use with a system for improving four dimension (4D) trajectory reliability and required time of arrival (RTA) reliability. The various tasks performed in connection with processes 800, 900 may be performed by software, hardware, firmware, or any combination thereof For illustrative purposes, the following description of processes 800, 900 may refer to elements mentioned above in connection with the preceding FIGS. In practice, portions of processes 800, 900 may be performed by different elements of the described system, e.g., a processor, a display element, or a data communication component. It should be appreciated that processes 800, 900 may include any number of additional or alternative tasks, the tasks shown in FIGS. 8 and 9 need not be performed in the illustrated order, and processes 800, 900 may be incorporated into a more comprehensive procedure or process having additional functionality not described in detail herein. Moreover, one or more of the tasks shown in FIGS. 8 and 9 could be omitted from an embodiment of the processes 800, 900 as long as the intended overall functionality remains intact.

Referring to FIG. 8, a method for an aircraft to accomplish a required time of arrival at a waypoint comprises determining 802 an aircraft speed and speed profile required along a given flight plan containing one or more speed constraints including AT, AT OR BELOW or AT or ABOVE speed constraints and a required time of arrival (RTA), wherein the determining the speed profile is selected from one or more of the mechanisms consisting of continuous RTA ECON speed management between speed constraints; padding of the AT speed constraint and an AT or ABOVE speed constraints; decelerating proactively; and using 704 a variable guidance margin, wherein the guidance margin is a speed change not included in a flight plan prediction.

Referring to FIG. 9, a method for an aircraft to accomplish a required time of arrival at a waypoint comprises padding 902 the AT or ABOVE speed constraint and the AT or BELOW speed constraint to preserve control margins; correcting 904 an initial time error using an RTA ECON speed modification between constraints; reducing 906 a positive speed pad if the RTA ECON speed falls below the lowest AT or ABOVE constraint plus the Padpos; increasing 908 the Padpos if previously reduced to its initial value prior to increasing the RTA ECON speed; using 910 the speed pad under AT or BELOW speed constraints; using 912 a guidance margin mechanism to increase robustness, reliability and also smoothness of RTA control; and activating 914, where the RTA ECON speed is not modifiable, a proactive deceleration as the aircraft approaches a deceleration segments to an AT or BELOW speed constraints or an approach speed.

The implementation of the exemplary embodiments described herein can be accomplished in any RTA capable FMS, but also within an Autopilot system or other system using information of time error and 4D trajectory variation monitoring that would be provided by a RTA capable FMS.

There are multiple ways to determine when to apply the guidance margin speed and when to stop its application. The mechanism can be used either always during the 4D operations or only when the aircraft speed gets close to the speed envelope. The triggering can use the position error or the time error estimation. In case of time error based threshold, the guidance margin could be applied when the long term strategy leads to a speed adjustment along the whole trajectory.

The value of the guidance margin could be either constant or computed based on the situation. It was confirmed by a human factors study in the European ERASMUS project that ATC is not disturbed by up to five percent of current speed, for example, 10 kts CAS difference.

Figure 10:
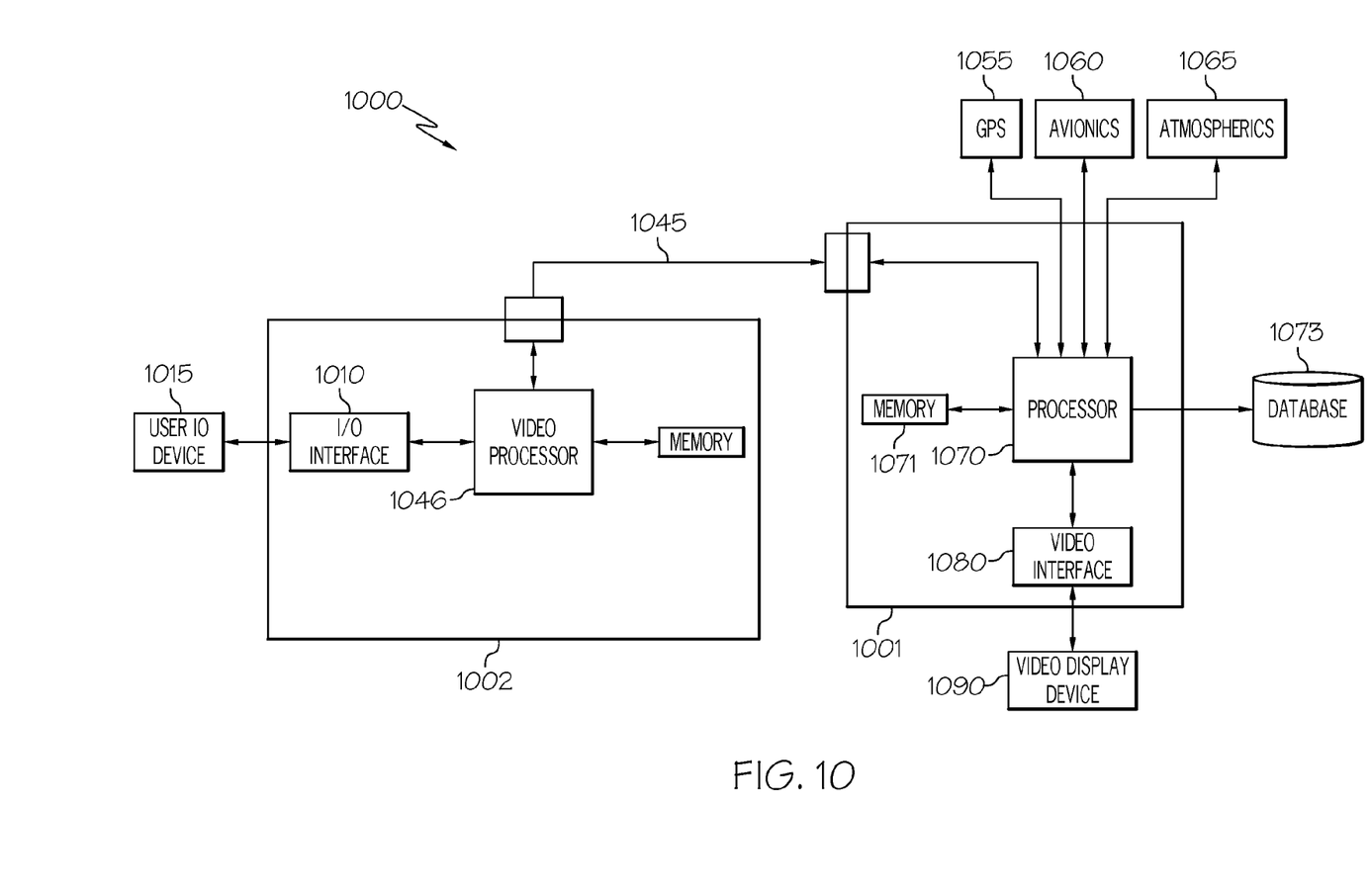
FIG. 10 is a functional block diagram of a known required time of arrival system configured to execute the exemplary embodiment with the algorithm of FIG. 1.

FIG. 10 is a simplified, exemplary architecture illustrating the components of a system 1000 that may be used to execute the smoothing of an RTA speed transition across multiple flight path regions and may comprise at least a Flight Management System ("FMS") or similar system. The system 1000 may include an FMS 1001, an RTA system 1002. The FMS 1001 and the RTA system 1002 may be referred to herein as "modules." Modules are structural components of a system or sub-system. The functionality of a module may be implemented using hardware, software, firmware or a combination thereof The FMS 1001 is an onboard system that controls the navigation of the aircraft (not shown) along the flight plan and may include RTA system capability. RTA capability allows an aircraft to "self-deliver" to a specified waypoint or waypoints of a flight plan at a specified time along a four-dimensional trajectory (latitude, longitude, altitude and time). The RTA system 1002 may be used within the context of the controlled time of arrival system described herein to help manage the burden on an ATC system resource.

Typically, the flight plan is preloaded into the FMS 1001 prior to departure. The FMS 1001 may comprise one or more suitable processors 1070 that are in operable communication with a memory device 1071 and/or a database 1073. The memory device 1071 may comprise any suitable memory and may contain current information of the aircraft operation or atmospheric environment. Exemplary, non-limiting memory devices may include random access memory (RAM) of any architecture, flash memory, a programmable logic device, erasable programmable read only memory (EEPROM), and the like. The database 1073 may contain more static information such as engine and airframe information that does not change appreciably during a flight. Processor 1070 may also be in operable communication with and receive information from a global positioning system 1055, aircraft avionics sensors 1060, and atmospheric sensors 1065. The FMS 1001 may also comprise a video display interface 1080 with which to display information on video display device 1090. One of ordinary skill in the art will recognize that the processors 1070, memory device 1071 and database 1073 and their functional equivalents each comprise a "computer readable storage medium" as the term is used herein. A computer readable storage medium is not a modulated electromagnetic signal.

In some embodiments, the FMS 1001 may also receive RTA profile information from the RTA system 1002 supplying course, speed and altitude change recommendations to arrive at a RTA waypoint on time. The RTA system 1002 may receive positioning information from global positioning system ("GPS") 1055, avionics information (such as aircraft velocity and ground speed) from avionics sensors 1060, and atmospheric information from atmospheric sensors 1065. In other embodiments the RTA system 1002 may be integrated into the FMS 1001 and may share information from the GPS 1055, avionics sensors 1060, and atmospheric sensors 1065 with the FMS 1001 over the exemplary interface 1045.

Further, unless explicitly stated otherwise, each numerical value and range described and/or illustrated herein should be interpreted as being approximate as if the word "about" or "approximately" preceded the value or range.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for an aircraft to accomplish a required time of arrival at a waypoint, comprising:
    determining, by a processor, an aircraft speed and speed profile required along a given flight plan containing one or more speed constraints including AT, AT OR BELOW or AT OR ABOVE speed constraints and a required time of arrival (RTA), wherein the determining the speed profile is based upon the mechanism consisting of:
        applying both a positive and a negative speed pads at a flight segment where both the AT OR BELOW and the AT OR ABOVE components of speed constraints apply,
        wherein the speed pads for the AT OR ABOVE speed constraints (PadPos) and for the AT OR BELOW speed constraints (PadNeg) determine the speed pad (PadDiv(i)) in an area (i) where the AT OR ABOVE speed constraint and the AT OR BELOW speed constraint difference (dV(i)) is less than twice a nominal speed pad (2*PadNom), and the PadDiv(i) is determined as:

If PadPos<PadNom, then PadDiv($i$)=PadPos*$dV(i)$/2/PadNom;

If PadNeg<PadNom, then PadDiv($i$)=(2*PadNom−PadNeg)*$dV(i)$/2/PadNom;

If PadDiv($i$)=$dV(i)$/2, and at least one or more of the mechanisms consisting of:
        continuous RTA ECON speed management between speed constraints;
        padding of an AT speed constraint and an AT or ABOVE speed constraint;
        decelerating proactively; and
        using a variable guidance margin, wherein the variable guidance margin is a speed change not included in a flight plan prediction.

2. The method of claim 1 further comprising:
    identifying insufficient control authority to reliably satisfy an entered time constraint; and
    increasing a size of the variable guidance margin.

3. The method of claim 2 further comprising adjusting the variable guidance margin for each of a plurality of altitudes and each of a plurality of flight segments.

4. The method of claim 2 further comprising determining the variable guidance margin based on a saturation of the speed profile.

5. The method of claim 1 further comprising continuous RTA speed management keeping the speed profile as close as possible to a minimal fuel cost RTA ECON speed satisfying a time constraint; and
    determining beginnings and ends of speed changes such that the AT, AT OR ABOVE, and AT OR BELOW speed constraints are satisfied.

6. The method of claim 1 further comprising adding a speed pad to the AT speed constraint or the AT or ABOVE speed constraint, thereby preventing speed saturation in a speed restricted area until a previous flight segment is saturated.

7. The method of claim 1 further comprising:
    applying the positive speed pad to the AT or ABOVE component of AT and AT OR ABOVE speed constraints along flight segments where the AT OR ABOVE component applies; and
    applying the negative speed pad to the AT or BELOW component of AT and AT OR BELOW speed constraints along flight segment where the AT OR BELOW component applies.

8. The method of claim 1 wherein the positive and negative speed pads are limited by a respective default value equal to the constant nominal speed pad (PadNom).

9. The method of claim 1 further comprising anticipating the determined proactive deceleration to a next speed constraint speed to ensure crossing the RTA constraint in time.

10. The method of claim 9 wherein anticipating the determined proactive deceleration further uses an anticipated speed pad reduction.

11. A method for an aircraft to accomplish a required time of arrival at a waypoint and at a desired speed, comprising:
    padding one of an AT OR ABOVE and AT OR BELOW components of a speed constraint to preserve at least one control margins;
    correcting an initial time error using a Continuous RTA ECON speed management between constraints;
    reducing a positive speed pad on the AT OR ABOVE component if a RTA speed falls below a lowest AT OR ABOVE component of the speed constraint plus a Padpos speed;
    increasing the Padpos speed to an initial value PadNom prior to increasing the RTA speed above a padded speed;

using a speed pad PadNeg under the AT OR BELOW speed constraints;

using a guidance margin mechanism to increase robustness, reliability and also smoothness of RTA control; and activating, where the RTA speed is not modifiable, a proactive deceleration of the aircraft as the aircraft approaches a deceleration segment to the AT or AT OR BELOW speed constraints or an approach speed.

12. The method of claim 11 further comprising:

maintaining a continuous RTA ECON speed to keep a speed profile as close as possible to a minimum fuel expenditure based RTA ECON speed satisfying the time constraint; and determining beginnings and ends of speed changes such that the AT, AT OR ABOVE, and AT OR BELOW speed constraints are satisfied.

13. A system determining an aircraft four dimensional trajectory along a path to a waypoint having a required time of arrival, the system comprising:

a processor configured to:

calculate a first estimated speed to reach the waypoint at the required time of arrival via a required time of arrival solver;

compute in real time a time difference between an estimated time of arrival at the first estimated speed and the required time of arrival via a trajectory predictor; and determine a speed correction for one of an AT speed constraint or an AT OR ABOVE speed constraint via a speed profile generator, wherein the determining a speed correction is selected from one or more of the mechanisms consisting of:

continuous RTA ECON speed management between speed constraints;

padding of the AT or ABOVE speed constraints;

decelerating proactively; and using a variable guidance margin, wherein the variable guidance margin is a speed change not included in a flight path prediction; and a display configured to:

display a graph including the first estimated speed, a second estimated speed, and a third estimated speed if the third estimated speed is above the highest AT or ABOVE speed constraint.

14. The system of claim 13 wherein the processor is further configured to:

identify insufficient control authority to reliably satisfy an entered time constraint; and increase the size of the variable guidance margin.

15. The system of claim 14 wherein the processor is further configured to:

adjust the variable guidance margin for different altitudes and different flight segments.

16. The system of claim 13 wherein the processor is further configured to:

keeping the speed profile as close as possible to a Cost index based RTA ECON speed satisfying a time constraint by continuous RTA ECON speed management; and determine the starts and ends of speed changes such that the AT, AT OR ABOVE and AT OR BELOW speed constraints are satisfied as much as possible.

17. The system of claim 13 wherein the processor is further configured to:

apply a positive speed pad to the AT or ABOVE component of the AT speed constraint, which will prevent speed saturation in a speed restricted area until a previous flight segment is saturated; and apply a negative speed pad to the AT or BELOW constraint to a second segment.

18. The system of claim 13 wherein the processor is further configured to:

determine, in view of the speed pads for the AT OR ABOVE speed constraints (PadPos) and for the AT OR BELOW speed constraints (PadNeg), the speed pad (PadDiv(i)) in an area (i) where the AT OR ABOVE speed constraint and the AT OR BELOW speed constraint difference (dV(i)) is less than twice a nominal speed pad (2*PadNom), wherein the PadDiv(i) is determined by:

If PadPos<PadNom, then PadDiv($i$)=PadPos*$dV(i)$/2/PadNom;

If PadNeg<PadNom, then PadDiv($i$)=(2*PadNom−PadNeg)*$dV(i)$/2/PadNom;

If PadDiv($i$)=$dV(i)$/2.

* * * * *